(12) United States Patent
Parmeter et al.

(10) Patent No.: US 8,203,250 B2
(45) Date of Patent: Jun. 19, 2012

(54) END COIL TIE DOWNS

(75) Inventors: Larry J. Parmeter, Broken Arrow, OK (US); Van J. McVicker, Collinsville, OK (US); Brett D. Leamy, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 407 days.

(21) Appl. No.: 12/503,677

(22) Filed: Jul. 15, 2009

(65) Prior Publication Data

US 2011/0012473 A1 Jan. 20, 2011

(51) Int. Cl.
*H02K 3/46* (2006.01)
(52) U.S. Cl. ........................................ 310/260
(58) Field of Classification Search .................. 310/260, 310/87, 270, 214
See application file for complete search history.

(56) References Cited

U.S. PATENT DOCUMENTS

| | | | | |
|---|---|---|---|---|
| 3,348,085 | A | * | 10/1967 | Coggeshall et al. .......... 310/260 |
| 3,435,517 | A | * | 4/1969 | Fortenbach et al. ............ 29/596 |
| 3,991,334 | A | * | 11/1976 | Cooper et al. ................ 310/260 |
| 4,037,126 | A | * | 7/1977 | Brennan et al. ............... 310/260 |
| 4,833,354 | A | | 5/1989 | Miller |
| 2010/0187942 | A1 | | 7/2010 | McCartney |

* cited by examiner

*Primary Examiner* — Dang Le
(74) *Attorney, Agent, or Firm* — Bracewell & Giuliani LLP

(57) ABSTRACT

A submersible electric pump motor comprises an unvarnished stator structure having stator windings formed of conductors. The stator windings form end coils at each end of the stator for each phase. The end coils are tied to three arc-shaped, metal segments, each having an opening and positioned circumferentially within a circumferential groove. The metal segments are welded to the interior of the housing to provide a rigid surface. High temperature strings are wound through the openings in each metal segment and around the end coils for each phase to tie each end coil of that phase to that metal segment. This prevents the end coils of each phase from twisting during startup, sliding into the slots, and moving inwards towards a rotating rotor.

16 Claims, 4 Drawing Sheets

END COIL TIE DOWNS

FIELD OF THE INVENTION

This invention relates in general to submersible electric motors, and in particular to restraining end coils in submersible electric motors without using varnish.

BACKGROUND OF THE INVENTION

Submersible electric motors may be utilized to drive Electrical Submersible Pump (ESP) systems used in the production of oil and water from wells. Submersible electric motors are typically comprised of a housing that houses a stator and a rotor. The rotor is concentrically located within the stator and can rotate during operation. The motor is filled with oil to lubricate the motor and provide heat removal during the operation of the motor. Typically the stator is constructed of multiple metallic laminations that form the stator stack. A pair of thick end laminations, one at each end of the stator stack, interface with a pair of retainer or snap rings, one at each end of the stator stack, to hold the stator stack in place. The thick end laminations and stator laminations have slots through which wires are wound in a conventional manner and into which epoxy or varnish can be introduced. The wound wires form windings that can be energized by a supply of electrical current to create an alternating electromagnetic field. As the windings enter and exit the slots during threading, they form end coils at each end of the stator.

In addition to acting as a moisture barrier and providing a layer of insulation, the varnish also supports the weight of the windings and prevents the end coils from moving. During operation, varnish acts to prevent the end coils from moving inwards toward the rotor and prevents the windings from moving down into the slots. However the varnish impregnation process is expensive and time consuming and makes the motor oil less efficient at removing heat from the windings in the slots and from the end coils. The varnish is also temperature limited and thus limits the conditions into which a motor can be introduced. Further, as the varnish ages, the varnish can flake and contaminate the motor oil, degrading the oil's ability to lubricate and remove heat.

A need exists for a technique that addresses the limitations and shortcomings described above. In particular a need exists for a technique to allow for restraining the end coils without the use of varnish and in a manner that makes motor fabrication less labor intensive and less temperature limited. The following technique solves these problems.

SUMMARY OF THE INVENTION

In an embodiment of the present technique, a motor housing containing the stator and rotor is provided. The stator is fabricated in a conventional manner, with several metallic laminations forming the stator stack and a thick end lamination located at each end of the stack. A pair of retainer rings, one at each end of the stator stack hold the stator stack in place. The stacked laminations are compressed during fabrication to build a spring-like force that will push outward against the retainer rings to prevent the stator from spinning. The thick end laminations and stator laminations have slots through which wires are wound in a conventional manner, forming end coils at each end of the stator. The wound wires form windings that can be energized by a supply of electrical current to create an alternating electromagnetic field.

In this embodiment, metal segments are welded to the inside of the housing. The metal segments each have a slot or hole cut into them and partially fit into a circumferential groove formed on the inner surface of the housing. During operation, the end coils will be tied to the metal segments to prevent the end coils from moving inwards toward the rotor or down into the slots of the stator, and to prevent the end coils from twisting during start-up.

During the manufacturing process, each metal segment is welded to the housing on either side of the formed slot. Once the wires are wound through the slots, several end coils will be formed at each end of the stator. For a three-phase motor, three separate wires will be threaded through the slots to produce three separate bundles of end coils. Each bundle of end coils representing one of the three phases will be tied to one of the three metal segments with high temperature string. The high temperature string can be wound through the openings in each metal segment and around the end coils for each phase to tie each end coil of that phase to that metal segment. The independent tying of each phase bundle to a metal segment will thereby transfer the force and torque to the housing to prevent the end coils of each phase from twisting during startup, sliding into the slots, and moving inwards towards a rotating rotor.

The installation of the metal segments during the manufacturing process allows for a relatively less labor intensive and less expensive assembly process because the metal segments are easily and quickly welded to the housing. In the past, the stator windings in the slots as well as the end coils had to be impregnated in varnish to immobilize the end coils. The varnish took time to cure and could degrade after years of service. Further, the metal segments do not have the temperature limitations of the varnish, allowing the motor's use in hotter wells.

DETAILED DESCRIPTION OF THE INVENTION

Figure 1:
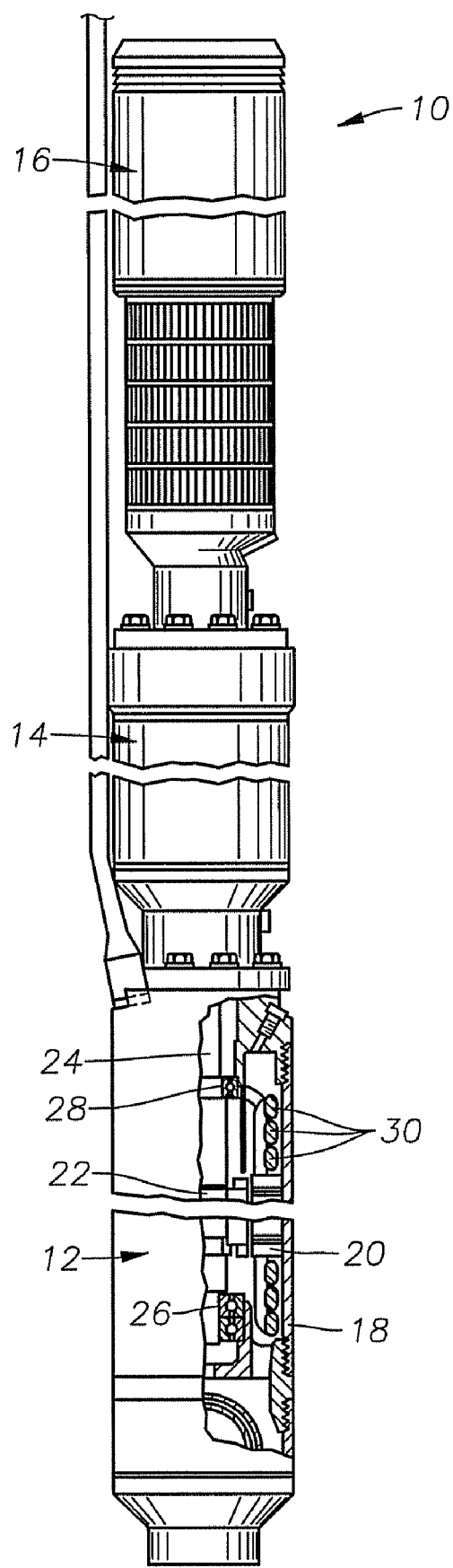
FIG. 1 shows a typical prior art ESP.

Referring to FIG. 1, a typical submersible ESP 10 is shown in which the present invention can be deployed. The ESP 10 can comprise a submersible electric motor 12, a seal section 14, and a pump 16. The motor 12 comprises a cylindrical housing 18, a stator 20 mounted within the housing 18, and a rotor 22 having a rotor shaft 24 to drive the pump 16. The rotor 22 is concentrically located within the stator and rotates during operation. The rotor 22 is typically supported by bearings 26 and 28. The motor 12 is filled with oil, such as mineral or synthetic oil, in a conventional manner. The shaft 24 has a section extending through seal section 14 and coupled to the shaft of pump 16. Seal section 14 also contains oil and accommodates expansion and contraction of the oil in the motor in a conventional manner. Alternatively, the expansion and contraction of the oil in the motor can be compensated by an expansion chamber.

Continuing to refer to FIG. 1, the motor 12 may typically be a three-phase motor, with the stator windings 30 providing an electromagnetic field when energized. The ESP 10 is typically suspended in the well fluid by production tubing (not shown) threaded onto the upper end of the pump 16, and the pump may discharge through the production tubing. Other types of ESP units are well known, and this ESP 10 is only an example of an ESP unit in which the invention may be deployed.

Figure 2:
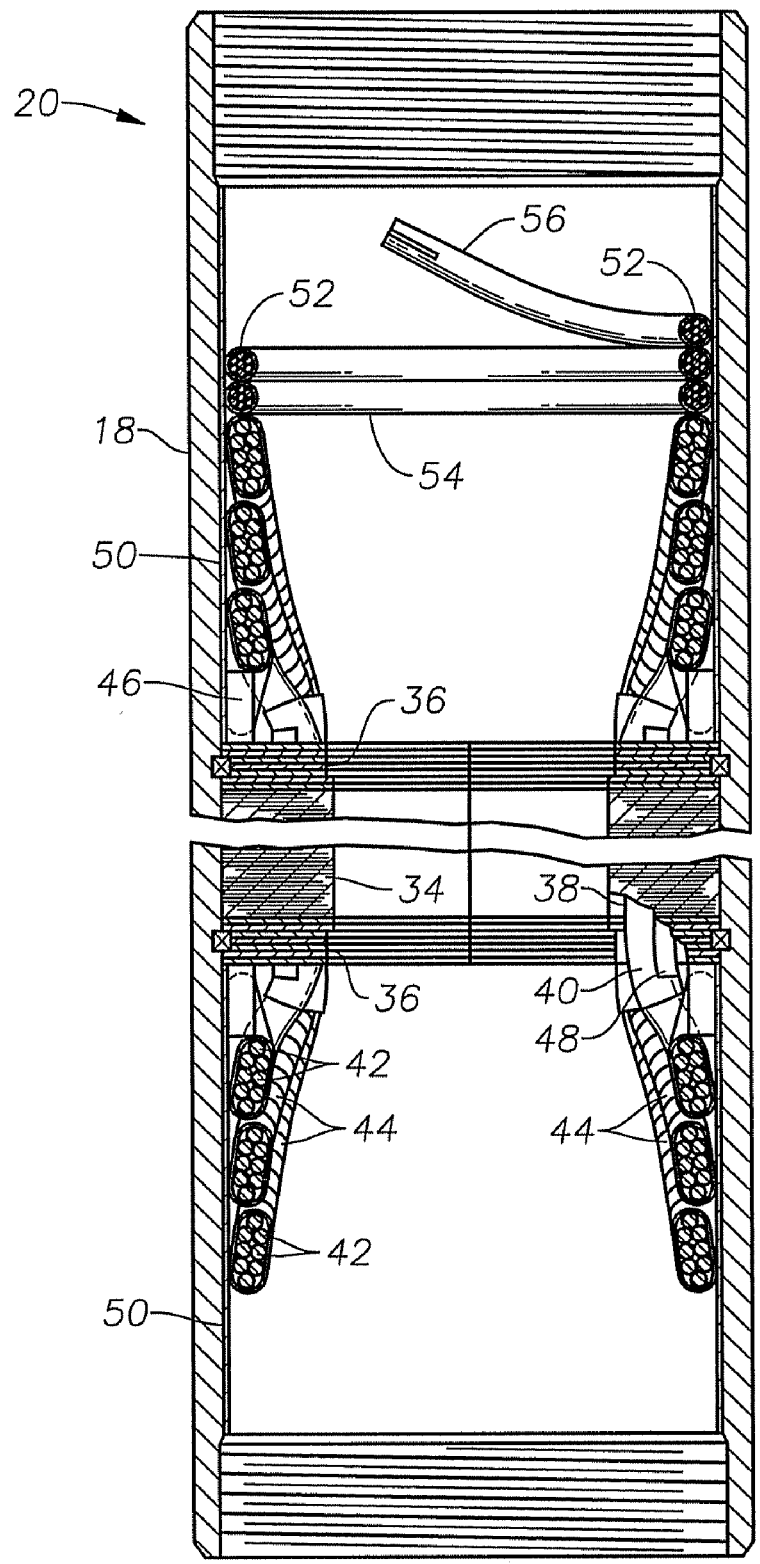
FIG. 2 shows a sectional view of a typical prior art stator for the ESP of FIG. 1.
Figure 3:
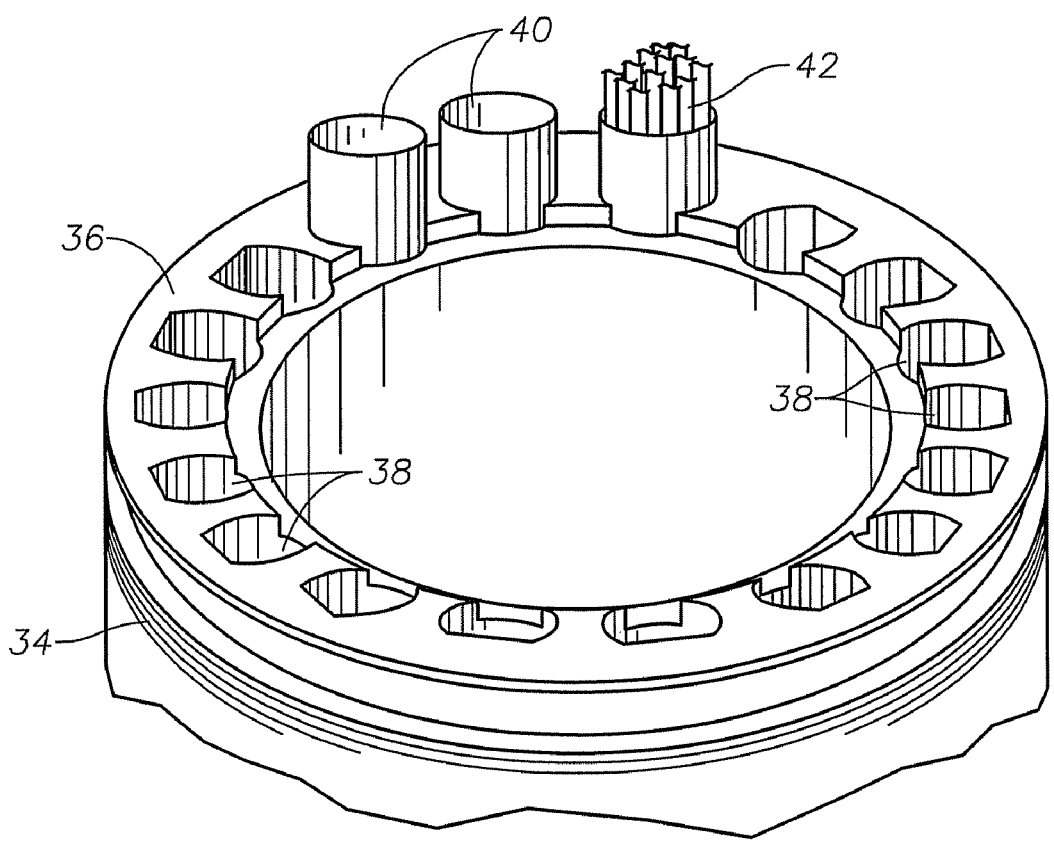
FIG. 3 shows a perspective view of stator slots of the stator of FIG. 3 in the process of being wound.

FIG. 2 shows a typical stator structure as known in the prior art. The stator structure comprises a stack of steel laminations 34 with thick end laminations 36 at opposite ends. Conventionally, the laminations 34 are perforated to provide longitudinal slots, such as the slots 38, disposed circumferentially around the stator. Each slot contains a slot liner 40, thorough which insulated magnet wire conductors 42 (FIG. 3) are inserted to form stator windings. Depending on the number of phases, the pattern of the windings will vary. Tape 44 can be wrapped around the conductors 42 where they emerge from the slot liners 40 and is usually in the form of a woven glass cloth that binds the emerging wires together. This provides the conductors 42 with the ability to resist the forces exerted on them during motor operation.

The conductors 42 themselves may be metallic wire wrapped in tape. For example copper wire can be wrapped in a helical overlapped fashion with an aromatic polymide tape, such as Kapton.

Continuing to refer to FIG. 2, a coil forming block 46 is conventionally used to facilitate the forming of the end coils at each end of the stator 20. Wedges 48 can be forced down into the slots 38 after the wires are in place to hold the winding wires in the slots 38. Further, electrically insulating sleeves 50 can line the interior of the ends of the housing 18 to separate the end coils from the housing 18. Lead wires 52, electrically insulated with tubing 54, can be soldered or otherwise connected to the conductors 42 that form the stator windings. A connector 56 at the end of each of the lead wires 52 connects the stator windings to a power cable (not shown) or can connect to another stator section if stacked sections are used in the motor. The stator windings and end coils would then conventionally be impregnated with varnish to immobilize them during operation. The present invention eliminates the need for varnish.

Figure 4:
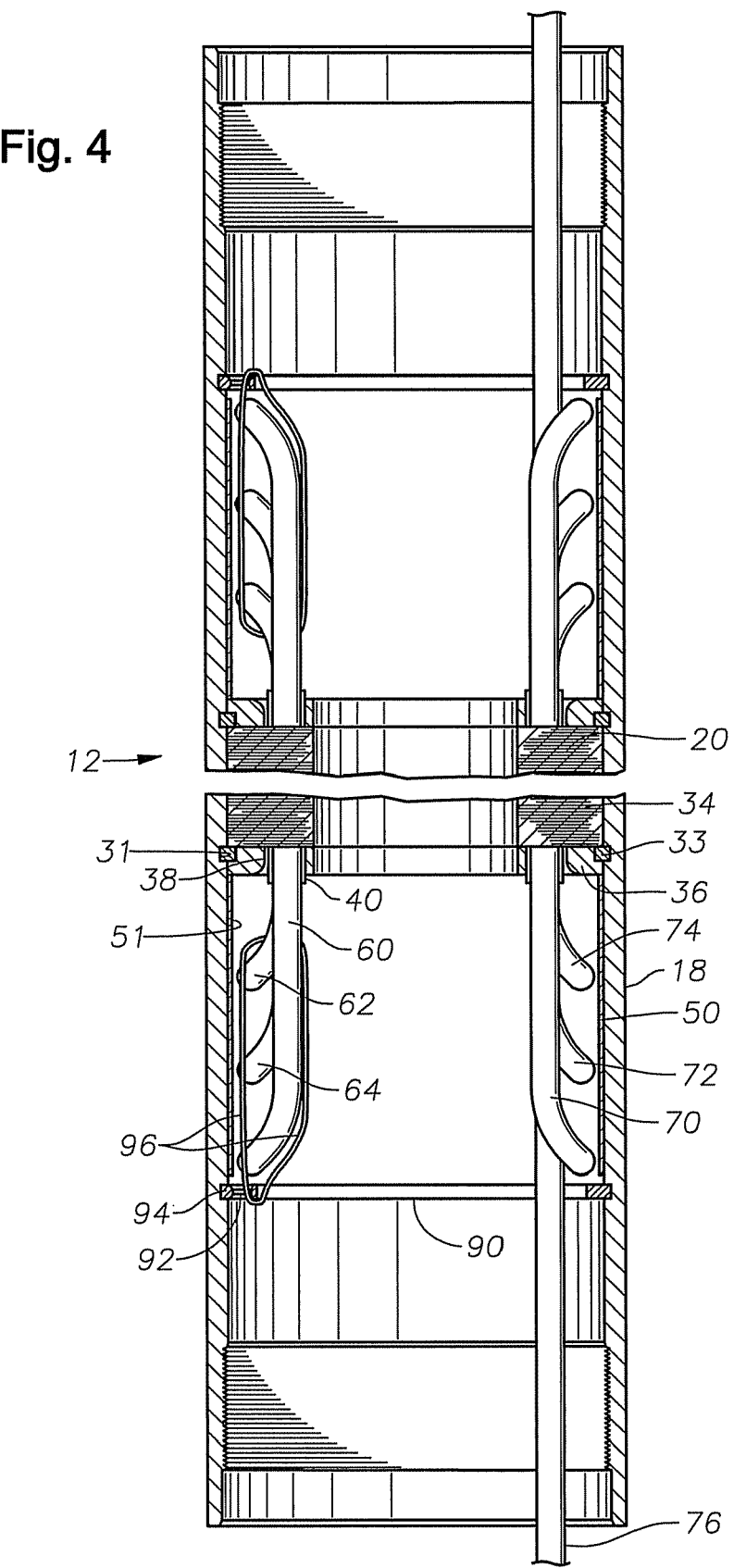
FIG. 4 shows a sectional view of a stator with metal segments, in accordance with the invention.

Referring to FIG. 4, a portion of an electric motor 12 is illustrated in a side sectional view in accordance with the invention. The motor 12 shown includes a cylindrical housing 18 having an inner surface 51 that may be lined with insulating sleeves 50. Coaxially disposed within the housing 18 is a stack of thin ring-like laminations 34 that when assembled as shown provide an inner bore circumscribing the motor longitudinal axis. The stack of laminations are conventionally compressed during fabrication to create a spring-like force that will push outward against the thicker end laminations 36. The thick end laminations 36 at each end within housing 18 supports the stack of laminations 34. The stack of laminations 32 forms a stator 20 within the motor 12. Circumferential grooves 31 are formed at opposite ends of the stator 20 and on the inner surface 51 of the housing 18. Grooves 31 receive a portion of a retainer ring or snap ring 33. The snap rings 33 engage the end laminations 36 to retain the stack of laminations 34 by coupling the end laminations 36 to the housing 18.

The thick end laminations 36 and stator laminations 34 have slots 38 through which wires or conductors 42 (FIG. 3) are wound in a conventional manner. The wound wires form windings that can be energized by a supply of electrical current supplied through a lead 76 to create an alternating electromagnetic field. In one example, a three-phase motor has a stator having eighteen slots 38, as shown conventionally in FIG. 3. During motor 12 operation, the energized windings turn a conventionally fabricated rotor 22 (FIG. 1) shown concentrically located within the stator 20. The rotor 26 can turn a conventional shaft 24 (FIG. 1) to perform work. In an embodiment the disks or laminations 34 of the stator 20 comprise magnetic steel and may be insulated from each other by conventional coatings. The lower and upper thick end laminations 36 can also be made of magnetic steel.

Continuing to refer to FIG. 4, the windings entering and exiting the stator slots 38 form end coils for each phase. One continuous wire is used for each phase and thus 3 separate wires will be wound through the slots 38 for a three-phase motor, with each wire occupying six of the eighteen slots. For example, in this embodiment, one continuous wire forms the end coils 60, 62, 64 which together form a bundle of end coils representing one phase. Similarly, another separate wire forms the end coils 70, 72, 74 which together form a second bundle of end coils representing another phase. The bundles can be wrapped with a tough dielectric material to protect the wires from chaffing. For clarity, FIG. 4 shows only two of the three bundles of end coils.

During start-up, the locked rotor torque experienced by the motor 12 is approximately 3.5 times more than running torque. Such forces cause the end coils to twist and move and the wires to move in the slots. Further, the end coils tend to move inward towards the motor. As explained in the prior art, varnish or epoxy could be used to prevent this movement of the end coils and wires. However, impregnating the end coils and wires with varnish is expensive and time consuming. Further, varnish has temperature limitations and degrades over time. Thus the temperature limitations of varnish or epoxy limit the well environments into which a motor can be deployed.

Figure 5:
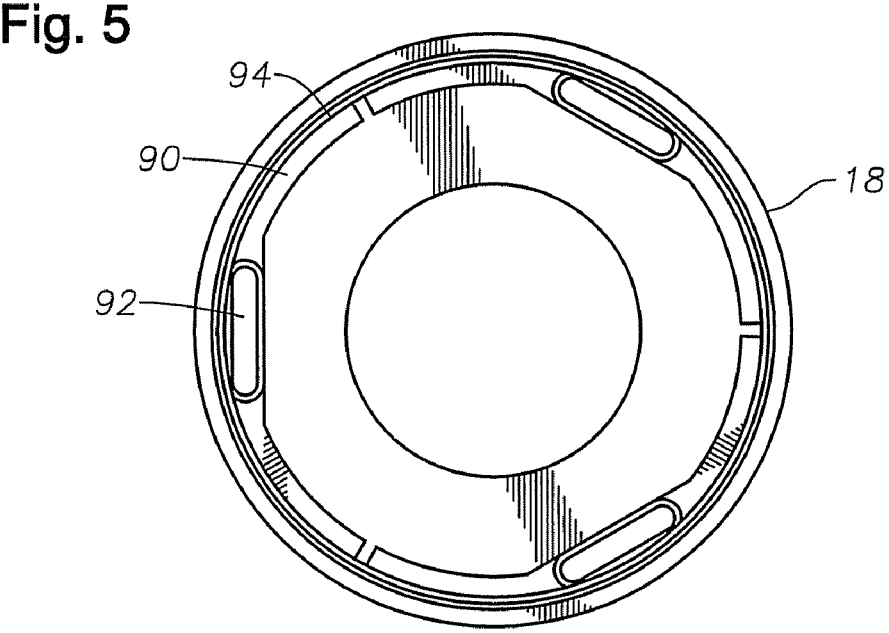
FIG. 5 shows a top view of the metal segments installed in the housing, in accordance with the invention.

In an embodiment of the motor 12 described herein, a circumferential groove 94 is formed on the inside surface 51 of the housing 18 to receive a portion of a metal segment 90. The circumferential groove 94 is formed a distance from the thick end lamination 36 that is slightly larger than the folded length of the largest end coil. In the example of FIG. 4, that would be end coils 60 or 70. A portion of the metal segments 90 projects annularly inward from the inner surface 51 of the housing 18. In the example shown in FIG. 5, three metal segments 90 are shown disposed circumferentially within the groove 94. The metal segments each have a hole or slot 92 formed in the portion that projects annularly inward. The metal segments are welded to the inner surface 51 of the housing 18 at either side of the formed slots 92.

As previously explained, coils 60, 62, and 64 form a bundle of end coils representing one phase. High temperature cord or string 96 such as Kevlar would then be wound through the slot 92 in one of the metal segments 90 and around the bundle formed by end coils 60, 62, and 64 (FIG. 4) to tie the end coils to the metal segment 90. Similarly, the bundle formed by end coils 70, 72, 74 would be tied to another of the three metal segments 90. The third bundle, not shown for clarity, would be tied to the remaining metal segment 90. The arrangement of metal segments 90, circumferential groove 94 and high temperature string is also utilized on the opposite end of the stator 20 to achieve the same results.

In another embodiment, multiple holes or slots 92 are formed in the metal segments 90.

In another embodiment, the metal segment 90 can be fastened to the housing 18 with fasteners such as screws.

In certain high temperature well conditions, motors can fail when the epoxy or varnish degrades, thereby allowing twisting of the insulated wires. Fatigue of the wire insulation associated with this repetitive twisting can thus lead to insulation failure. By replacing the varnish with the metal segments 90 secured to the inner surface 51 of the housing 18, and the high temperature string, the motor can advantageously be deployed in high temperature wells without the limitations associated with varnished motors and without compromising the ability to prevent undesired movement of the end coils and wires in the stator slots 38. The independent tying of each phase bundle to a separate metal segment 90 will thereby transfer the force and torque to the housing 18 via the metal segment 90 to prevent the end coils of each phase from twisting during startup, sliding into the slots, and moving inwards towards the rotating rotor. Preventing the end coils from twisting, moving toward the rotor, or the wires from sliding into the slots thus can advantageously prevent the failure of motors due to insulation failure.

While the invention has been shown in only one of its forms, it should be apparent to those skilled in the art that it is not so limited but is susceptible to various changes without departing from the scope of the invention.

What is claimed is:

1. A method for restraining end coils of stator windings of a motor comprising:
   a) forming a circumferential groove in an inner diameter of a housing of the motor adjacent an end of the stator and mounting a retainer in the groove; and
   b) securing the end coils to the retainer.

2. The method of claim 1, wherein step a) comprises adhering the retainer to the inner diameter of the housing.

3. The method of claim 2, wherein step a) comprises welding the retainer to the inner diameter of the housing.

4. The method of claim 1, wherein step a) comprises positioning three separate metal segments in the groove; and step b) comprises securing a portion of the end coils to each of the metal segments.

5. The method of claim 4, wherein step a) comprises welding each of the metal segments to the interior of the housing.

6. The method of claim 1, wherein step b) comprises tying each end coil to the retainer with cord.

7. The method of claim 1, wherein steps a) and b) are performed opposite both ends of the stator.

8. The method of claim 1, wherein step a) comprises providing the retainer with a plurality of slots and step (b) comprises tying the end coils to the retainer by extending cords through the slots and around the end coils.

9. An electrical motor, comprising:
   a stator rigidly mounted within a housing, the stator having a plurality of slots extending through the length of the stator;
   a metal wire threaded through the slots in the stator, the entry and exit of the wire through the slots forming a plurality of end coils at each end of the stator;
   a retainer mounted to an inner diameter of the housing adjacent an end of the stator, the retainer comprising a plurality of apertures spaced circumferentially apart from each other; and
   wherein the end coils are secured to the retainer by at least one cord, the cord passing through a loop of the end coils and through at least one of the plurality of apertures, to prevent movement of the end coils during operation of the motor.

10. The motor of claim 9, wherein the retainer is welded to the inner diameter of the housing.

11. The motor of claim 9, further comprising a circumferential groove formed in the inner diameter of the housing and wherein the retainer is mounted in the groove.

12. The motor of claim 11, wherein the retainer is welded in the groove.

13. The motor of claim 11, wherein the retainer comprises three separate metal segments mounted in the groove and spaced circumferentially around.

14. The motor of claim 13, wherein each segment has a slot and the end coils are tied to the segments by cords wrapped around the end coils and extending thru the slots.

15. An electrical motor, comprising:
   a stator rigidly mounted within a housing, the stator having eighteen slots extending through the length of the stator;
   three separate lengths of metal wire threaded through the slots in the stator, each wire occupying six slots to accommodate three-phase electrical power, the entry and exit of the wire through the slots forming a plurality of end coils at each end of the stator, the end coils wrapped with a high dielectric material to protect the wires fanning the end coils from abrasion;
   a first pair of circumferential grooves formed on the inner diameter of the housing, the first pair of circumferential grooves spaced a distance approximately corresponding with the ends of the stator;
   a second pair of circumferential grooves formed on the inner diameter of the housing, the second pair of circumferential grooves spaced a distance apart from each other that is greater than the length of the stator;
   a snap ring positioned within each of the first pair of circumferential grooves, each of the snap rings being in contact with one of the ends of the stator;
   three arc-shaped, metal segments, each having an opening and positioned circumferentially within each of the second pair of circumferential grooves, the metal segments being welded to the interior of the housing; and
   a plurality of high temperature strings wound through the openings in each metal segment and around the end coils for each phase to tie each end coil of that phase to that metal segment, to thereby prevent the end coils of each phase from twisting during startup, sliding into the slots, and moving inwards towards a rotating rotor.

16. The motor of claim 15, wherein the end coils associated with a first phase are tied to a first one of the segments, the end coils associated with a second phase are tied to a second one of the segments; and the end coils associated with a third phase are tied to a third one of the segments.

* * * * *